(12) United States Patent
Stein

(10) Patent No.: US 11,513,524 B2
(45) Date of Patent: Nov. 29, 2022

(54) THREE-DIMENSIONAL ANALYTIC TOOLS AND METHODS FOR INSPECTIONS USING UNMANNED AERIAL VEHICLES

(71) Applicant: Eyal Stein, Sharon, MA (US)

(72) Inventor: Eyal Stein, Sharon, MA (US)

(73) Assignee: 5X5 Technologies, Inc., St. Petersburg, FL (US)

( * ) Notice: Subject to any disclaimer, the term of this patent is extended or adjusted under 35 U.S.C. 154(b) by 20 days.

(21) Appl. No.: 16/953,572

(22) Filed: Nov. 20, 2020

(65) Prior Publication Data

US 2021/0157319 A1   May 27, 2021

Related U.S. Application Data

(62) Division of application No. 15/698,683, filed on Sep. 8, 2017, now Pat. No. 10,871,774.

(60) Provisional application No. 62/385,009, filed on Sep. 8, 2016.

(51) Int. Cl.
| | |
|---|---|
| *B64C 39/00* | (2006.01) |
| *G05D 1/00* | (2006.01) |
| *B64C 39/02* | (2006.01) |
| *G06T 17/05* | (2011.01) |
| *G06V 20/10* | (2022.01) |

(52) U.S. Cl.
CPC ......... *G05D 1/0094* (2013.01); *B64C 39/024* (2013.01); *G06T 17/05* (2013.01); *G06V 20/176* (2022.01); *B64C 2201/123* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 10,497,129 B1 * | 12/2019 | Cui | .............. G06V 10/147 |
| 10,505,622 B1 | 12/2019 | Stein et al. | |
| 10,586,462 B1 | 3/2020 | Stein et al. | |
| 2016/0307447 A1 | 10/2016 | Johnson et al. | |
| 2017/0142023 A1 | 5/2017 | Yadav et al. | |
| 2017/0192418 A1 | 7/2017 | Bethke et al. | |
| 2018/0002010 A1 | 1/2018 | Baur et al. | |
| 2018/0004207 A1 | 1/2018 | Michini et al. | |
| 2018/0032088 A1 | 2/2018 | van Cruyningen | |
| 2018/0218214 A1 | 8/2018 | Pestun et al. | |
| 2019/0220002 A1 * | 7/2019 | Huang | .............. G06F 1/163 |
| 2020/0099441 A1 | 3/2020 | Stein et al. | |
| 2021/0150096 A1 * | 5/2021 | Priest | .............. G06V 20/176 |

* cited by examiner

*Primary Examiner* — James M McPherson

(74) *Attorney, Agent, or Firm* — Morgan, Lewis & Bockius, LLP

(57) ABSTRACT

In various embodiments, three-dimensional models of terrestrial structures are developed and scaled utilizing images acquired during the flight path of an unmanned aerial vehicle.

14 Claims, 6 Drawing Sheets

THREE-DIMENSIONAL ANALYTIC TOOLS AND METHODS FOR INSPECTIONS USING UNMANNED AERIAL VEHICLES

RELATED APPLICATIONS

This application is a division of U.S. patent application Ser. No. 15/698,683, filed Sep. 8, 2017, which claims the benefit of and priority to U.S. Provisional Patent Application No. 62/385,009, filed Sep. 8, 2016, the entire disclosure of each of which is hereby incorporated herein by reference.

TECHNICAL FIELD

In various embodiments, the present invention relates to inspection of terrestrial structures, objects and features using unmanned aerial vehicles and analytical tools therefor.

BACKGROUND

An unmanned aerial vehicle (UAV), commonly known as a drone or unmanned aerial system (UAS) and also referred to as a remotely piloted aircraft, is a flight vehicle without a human pilot aboard. Its path is controlled either autonomously by onboard computers or by the remote control of a pilot on the ground or in another vehicle. Drones have proliferated in number as recognition of their widespread and diverse commercial potential has increased. Numerous industries are embracing drones to improve or streamline day-to-day operations. In addition, a rapidly growing hobbyist community has been inspired by the marvel of owning technology previously accessible only to governments, national agencies, and film producers with creative special effects departments.

One benefit enabled by the increased availability and use of UAVs is the ability to inspect and survey elevated structures without requiring physical human presence on the structure. Use of UAVs thus expedites and enhances human safety for such tasks, as the inspector need not physically climb the structure. Rather, a human operator may control a camera-equipped UAV to capture images of such structures quickly and safely from a wide variety of different vantage points.

While the use of UAVs has in many ways revolutionized survey and inspection of elevated structures such as towers, masts, and buildings, it would be beneficial to utilize the images captured by a UAV to create a three-dimensional (3D) model of the structure that enables the generation of an interactive data set that is user-manipulable—with such data sets, an inspector need not rely on only still-frame images or videos captured by the UAV. However, one difficulty with the assembly of such data sets is precisely orienting the 3D model in space so that the model accurately represents the alignment of the surveyed structure with respect to the Earth's surface (or features thereon). One technique of alignment involves the time-consuming placement of ground markers near the structure followed by, e.g., laser range-finding to determine distances to the ground markers, and then correlating these ground markers in the images or videos captured by the UAV. Thus, there is a need for faster, more efficient techniques and systems for inspection and survey of terrestrial structures using UAVs that enable the generation and accurate alignment of 3D models of the structures without requiring the placement of ground markers.

SUMMARY

In accordance with embodiments of the present invention, a camera-equipped UAV is utilized to inspect a terrestrial structure, and the images captured via the UAV are utilized to generate a 3D model of the structure and accurately align the model (including representations of any features of interest on the structure) relative to the coordinate system of the Earth. Advantageously, the use of extrinsic ground markers is avoided, and generation and alignment of the 3D model is performed utilizing only the captured images themselves in conjunction with flight-path data from the UAV. For example, alignment of the 3D model of the structure along at least one axis (e.g., the tilt axis and/or the roll axis) may be performed via recognition and use of the horizon line in the background of at least some of the images of the structure captured by the UAV. The UAV travels along a known flight path around the structure, and the position of the UAV (and thus the relative position between the UAV and the structure) may be determined via, e.g., global positioning system (GPS) coordinates and altitude measurements (e.g., barometric altitude measurements) acquired by the UAV. Such flight-path data may be utilized to accurately scale the model of the structure and align the model on at least one other axis (e.g., the azimuthal axis).

Once the 3D model of the structure has been generated and accurately scaled and aligned, the model may be used to extract metrics and other information of interest to the user, while the user observes and manipulates only high-resolution views of the structure to provide information regarding the absolute alignment and position and/or any feature of interest thereon. In this manner, such information may be accurately and safely generated without the need for physical human presence on or near the terrestrial structure.

In exemplary embodiments, systems and techniques in accordance with embodiments of the invention may be utilized to inspect terrestrial structures such as cell towers which, solely for illustrative purposes, the ensuing description will discuss. As known in the art, a cell tower is a cellular telephone site where antennae and electronic communications equipment are placed, usually on a radio mast, tower or other elevated structure, to create a cell (or adjacent cells) in a cellular network. A cell tower may support, for example, antennae, and one or more sets of transmitter/receivers, transceivers, digital signal processors, control electronics, a GPS receiver for timing, and primary and backup electrical power sources. As such, the term "cell tower," as utilized herein, encompasses all such structures, including those typically referred to as "base transceiver stations," "mobile or cellular phone masts," "cell sites," and "base stations." In accordance with embodiments of the invention, 3D computational models of cell towers and antennae thereon are generated and aligned in three mutually perpendicular axes so that information such as the elevation (i.e., the "rad center height") and/or the orientation of the antennae (i.e., the direction in which they point relative to the Earth's surface) are provided to a user of the models. In other embodiments, images may be captured and models generated of other terrestrial structures and features of interest thereon and/or associated therewith, and the present invention is not limited in its applicability to cell towers or like structures.

As utilized herein, the term "inspect" means any observation and documentation of images and/or measurements of a structure, and is intended to encompass such tasks as "surveying," "documenting," etc. "Terrestrial structures" (or simply "structures" for inspection), as contemplated herein, include any structures extending from or on (e.g., in the manner of a tower or building), suspended over (e.g., in the manner of a bridge or arch), or floating over (e.g., in the manner of a balloon) the surface of the Earth and disposed within the atmosphere thereof. The terms "UAV," "UAS," and "drone" are utilized interchangeably herein. The term "camera" as used herein encompasses any optical instrument for recording and/or capturing images, including such optical sensors as CCD arrays and photodiodes. While position determination is mainly described herein as utilizing GPS coordinates, embodiments of the invention encompass the use of any number of alternative position-determination systems in addition to or instead of GPS, including satellite-based systems other than GPS, bathymetric navigation systems, celestial navigation systems, as well as systems determining position based on receipt of signals such as television, radio, cell towers, and/or lighting. As utilized herein, flight paths of UAVs that "at least partially orbit" a terrestrial structure include not only flight paths that fully encircle the structure (which may take place substantially in a single horizontal plane or with the UAV changing altitude one or more times during the flight path), but also flight paths composed of one or more generally vertical paths proximate the structure and flight paths during which the structure is only partially circumnavigated (again, at one or more vertical altitudes during the flight path).

The term 3D model or 3D graphical representation refers to any computational (e.g., computer-aided design) rendering of a physical object that encodes and visually represents the spatial features of the object. A 3D model may include surface features or may be a simple wireframe, or may facilitate selection of different renderings with varying degrees of detail. The 3D model may be scalable, and may encode sufficient overall surface or structural information to permit viewing of the rendered object from different angles selectable by the viewer. 3D modeling tools are widely available and include, for example, AUTOCAD, SOLIDWORKS, BLENDER, and SKETCHUP.

In an aspect, embodiments of the invention feature a system for developing and rendering a three-dimensional (3D) model of a terrestrial structure. The system includes, consists essentially of, or consists of a computer memory, one or more computer processors, an image-stitching module executable by the one or more computer processors, a feature-identification module executable by the one or more computer processors, a scaling module executable by the one or more computer processors, and an alignment module executable by the one or more computer processors. The computer memory stores (i) images of the structure obtained by an unmanned aerial vehicle (UAV) along a flight path that at least partially orbits the structure one or more times, each of the images corresponding to a different relative position between the UAV and the structure, at least some of the images including a view of the horizon and (ii) positioning coordinates (e.g., global positioning system (GPS) coordinates) for the UAV at each of the relative positions. The image-stitching module generates a 3D model of the structure from the plurality of images. The 3D model may lack scale and/or alignment information. The feature-identification module identifies a horizon line within one or more of the images. The scaling module calibrates a scale for the 3D model based at least in part on distances between at least some of the relative positions. The alignment module aligns the 3D model based at least in part on the identified horizon line within the one or more of the images.

Embodiments of the invention may include one or more of the following in any of a variety of combinations. The alignment module may be configured to align the 3D model on (i) a tilt axis and (ii) and a roll axis perpendicular to the tilt axis based at least in part on the identified horizon line within the one or more of the images. The alignment module may be configured to align the 3D model on an azimuthal axis perpendicular to the tilt and roll axes based at least in part on the GPS coordinates of at least some of the relative positions. The system may include a communication interface for bi-directional communication with a UAV. The system may include a display for rendering the model along a user-selected viewing axis. The image-stitching module may execute or include, consist essentially of, or consist of photogrammetry software. The system may include a display module executable by the one or more computer processors. The display module may display the 3D model after scaling and alignment thereof to a user. The structure may include, consist essentially of, or consist of a cell tower. At least one of the features of interest may include, consist essentially of, or consist of an antenna.

In another aspect, embodiments of the invention feature a system for developing and rendering a three-dimensional (3D) model of a terrestrial structure. The system includes, consists essentially of, or consists of a computer memory, one or more computer processors, an image-stitching module executable by the one or more computer processors, a feature-identification module executable by the one or more computer processors, a scaling module executable by the one or more computer processors, an alignment module executable by the one or more computer processors, and an unmanned aerial vehicle (UAV) operable along a flight path that at least partially orbits the structure one or more times. The UAV acquires a plurality of images of the structure along the flight path. Each of the images is acquired at a different relative position between the UAV and the structure. One or more of the images includes a view of the horizon. The UAV also acquires positioning coordinates (e.g., global positioning system (GPS) coordinates) of the UAV at each of the relative positions. The computer memory stores (i) the images of the structure acquired by the UAV and (ii) the positioning coordinates (e.g., GPS coordinates) of the UAV at each of the relative positions. The image-stitching module generates a 3D model of the structure from the plurality of images. The 3D model may lack scale and/or alignment information. The feature-identification module identifies a horizon line within one or more of the images. The scaling module calibrates a scale for the 3D model based at least in part on distances between at least some of the relative positions. The alignment module aligns the 3D model based at least in part on the identified horizon line within the one or more of the images.

Embodiments of the invention may include one or more of the following in any of a variety of combinations. The alignment module may be configured to align the 3D model on (i) a tilt axis and (ii) and a roll axis perpendicular to the tilt axis based at least in part on the identified horizon line within the one or more of the images. The alignment module may be configured to align the 3D model on an azimuthal axis perpendicular to the tilt and roll axes based at least in part on the GPS coordinates of at least some of the relative positions. The system may include a communication interface for bi-directional communication with the UAV. The system may include a display for rendering the model along a user-selected viewing axis. The image-stitching module may execute or include, consist essentially of, or consist of photogrammetry software. The system may include a display module executable by the one or more computer processors. The display module may display the 3D model after scaling and alignment thereof to a user. The structure may include, consist essentially of, or consist of a cell tower. At least one of the features of interest may include, consist essentially of, or consist of an antenna. The UAV may include a video camera for acquiring a video stream during operation along the flight path. The UAV may include a transmitter for transmitting the video stream to a remote human operator (e.g., human operator of the UAV) and/or to a remote human recipient. The remote human recipient may have no direct line of sight to the structure and/or to one or more of the features of interest. The UAV may include a radio-frequency identification (RFID) scanner for scanning RFID tags on or associated with the structure while the UAV is operated along the flight path. The UAV may include a spectrum analyzer for measuring signal strengths of signals emitted by the structure and/or at least one of the features of interest.

In yet another aspect, embodiments of the invention feature a method of inspecting a terrestrial structure using an unmanned aerial vehicle (UAV). The structure includes one or more features of interest therein, thereon, or associated therewith. The UAV is operated along a flight path that at least partially orbits the structure one or more times. A plurality of images of the structure is acquired from the UAV along the flight path. Each of the images is acquired at a different relative position between the UAV and the structure. One or more of the images includes a view of the horizon. Positioning coordinates (e.g., global positioning system (GPS) coordinates) of the UAV at each of the relative positions are received. A three-dimensional (3D) model of the structure is computationally generated from the plurality of images. The 3D model may lack scale and/or alignment information. The 3D model is computationally aligned on three mutually perpendicular axes based at least in part on the views of the horizon included in the one or more of the images. A scale of the 3D model is computationally calibrated based at least in part on distances between at least some of the relative positions. One or more characteristics (e.g., a height and/or an orientation relative to the horizon) of at least one feature of interest may be calculated using the 3D model. The one or more characteristics may be displayed to a user.

Embodiments of the invention may include one or more of the following in any of a variety of combinations. Computationally aligning the 3D model on three mutually perpendicular axes may include, consist essentially of, or consist of computationally aligning the 3D model on (i) a tilt axis and (ii) and a roll axis perpendicular to the tilt axis based at least in part on the views of the horizon included in the at least some of the images. Computationally aligning the 3D model on three mutually perpendicular axes may include computationally aligning the 3D model on an azimuthal axis perpendicular to the tilt and roll axes based at least in part on the positioning coordinates (e.g., GPS coordinates) of at least some of the relative positions. The structure may include, consist essentially of, or consist of a cell tower. At least one of the features of interest may include, consist essentially of, or consist of an antenna. A video stream may be acquired using a video camera on the UAV during operation of the UAV along the flight path. The video stream may be transmitted to a remote human operator (e.g., human operator of the UAV) and/or to a remote human recipient. The remote human recipient may have no direct line of sight to the structure and/or to one or more of the features of interest. The structure and/or one or more features of interest may have one or more radio-frequency identification (RFID) tags thereon, therein, and/or associated therewith. The UAV may include an RFID scanner for scanning the RFID tags while the UAV is operated along the flight path. At least one of the RFID tags may include, consist essentially of, or consist of a sensor for sensing an environmental condition of and/or proximate the structure and/or one or more of the features of interest. The sensor may include, consist essentially of, or consist of a vibration sensor, a humidity sensor, a corrosion sensor, and/or a temperature sensor. The 3D model may be generated by or utilizing photogrammetry software. The 3D model may be displayed to a user (e.g., before and/or after scaling and alignment of the 3D model). At least one of the features of interest may include, consist essentially of, or consist of an antenna or a transmitter. One or more signal strengths of the at least one of the features of interest may be acquired during operation of the UAV along the flight path.

In another aspect, embodiments of the invention feature a system for the inspection of and development of three-dimensional (3D) models of a terrestrial structure using an unmanned aerial vehicle (UAV). The structure may include one or more features of interest therein, thereon, or associated therewith. The UAV (i) is operated along a flight path that at least partially orbits the structure one or more times, (ii) acquires a plurality of images of the structure along the flight path, and (iii) receives positioning coordinates (e.g., global positioning system (GPS) coordinates) of the UAV at each of the relative positions. Each of the images is acquired at a different relative position between the UAV and the structure, and at least one of the images includes a view of the horizon. The system includes, consists essentially of, or consists of one or more computer processors, a communication interface for bi-directional communication with the UAV, an image-stitching module executable by the one or more computer processors, a feature-identification module executable by the one or more computer processors, a scaling module executable by the one or more computer processors, and an alignment module executable by the one or more computer processors. The image-stitching module generates a 3D model of the structure from the plurality of images, and the 3D model may lack scale and/or alignment information. The feature-identification module identifies a horizon line within one or more of the images. The scaling module calibrates a scale for the 3D model based at least in part on distances between at least some of the relative positions. The alignment module aligns the 3D model on (i) a tilt axis and (ii) and a roll axis perpendicular to the tilt axis based at least in part on the views of the horizon included in the at least one one of the images. The alignment module also aligns the 3D model on an azimuthal axis perpendicular to the tilt and roll axes based at least in part on the positioning coordinates (e.g., GPS coordinates) of at least some of the relative positions.

Embodiments of the invention may include one or more of the following in any of a variety of combinations. The structure may include, consist essentially of, or consist of a cell tower. At least one of the features of interest may include, consist essentially of, or consist of an antenna. The UAV may include a video camera for acquiring a video stream during operation along the flight path. The UAV may include a transmitter for transmitting the video stream to a remote human operator (e.g., human operator of the UAV) and/or to a remote human recipient. The remote human recipient may have no direct line of sight to the structure and/or to one or more of the features of interest. The structure and/or one or more features of interest may have one or more radio-frequency identification (RFID) tags thereon, therein, and/or associated therewith. The UAV may include an RFID scanner for scanning the RFID tags while the UAV is operated along the flight path. At least one of the RFID tags may include, consist essentially of, or consist of a sensor for sensing an environmental condition of and/or proximate the structure and/or one or more of the features of interest. The sensor may include, consist essentially of, or consist of a vibration sensor, a humidity sensor, a corrosion sensor, and/or a temperature sensor. The image-stitching module may execute or may include, consist essentially of, or consist of photogrammetry software. The system may include a display module executable by the one or more computer processors. The display module may display the 3D model to a user (e.g., before and/or after scaling and alignment of the 3D model). At least one of the features of interest may include, consist essentially of, or consist of an antenna or a transmitter. The UAV may include a spectrum analyzer for measuring one or more signal strengths of the at least one of the features of interest.

In another aspect, embodiments of the invention feature a method of inspecting a terrestrial structure using an unmanned aerial vehicle (UAV). The structure may include one or more features of interest therein, thereon, or associated therewith. The UAV is operated along a flight path that at least partially orbits the structure one or more times. A plurality of images of the structure is acquired from the UAV along the flight path. Each of the images is acquired at a different relative position between the UAV and the structure. One or more of the images includes a view of the horizon. Positioning coordinates (e.g., global positioning system (GPS) coordinates) of the UAV are received at each of the relative positions. A three-dimensional (3D) model of the structure is generated by one or more computer processors from the plurality of images. The 3D model may lack scale and/or alignment information. The 3D model is aligned, by the one or more computer processors, on (i) a tilt axis and (ii) and a roll axis perpendicular to the tilt axis based at least in part on the views of the horizon included in the at least one of the images. A scale of the 3D model is calibrated, by the one or more computer processors, based at least in part on distances between at least some of the relative positions. The 3D model is aligned, by the one or more computer processors, on an azimuthal axis perpendicular to the tilt and roll axes based at least in part on the positioning coordinates (e.g., GPS coordinates) of at least some of the relative positions. One or more characteristics (e.g., a height and/or an orientation relative to the horizon) of at least one feature of interest may be calculated using the 3D model and the one or more computer processors. The one or more characteristics may be displayed to a user.

Embodiments of the invention may include one or more of the following in any of a variety of combinations. The structure may include, consist essentially of, or consist of a cell tower. At least one of the features of interest may include, consist essentially of, or consist of an antenna. A video stream may be acquired using a video camera on the UAV during operation of the UAV along the flight path. The video stream may be transmitted to a remote human operator (e.g., human operator of the UAV) and/or to a remote human recipient. The remote human recipient may have no direct line of sight to the structure and/or to one or more of the features of interest. The structure and/or one or more features of interest may have one or more radio-frequency identification (RFID) tags thereon, therein, and/or associated therewith. The UAV may include an RFID scanner for scanning the RFID tags while the UAV is operated along the flight path. At least one of the RFID tags may include, consist essentially of, or consist of a sensor for sensing an environmental condition of and/or proximate the structure and/or one or more of the features of interest. The sensor may include, consist essentially of, or consist of a vibration sensor, a humidity sensor, a corrosion sensor, and/or a temperature sensor. The 3D model may be generated by or utilizing photogrammetry software. The 3D model may be displayed to a user (e.g., before and/or after scaling and alignment of the 3D model). At least one of the features of interest may include, consist essentially of, or consist of an antenna or a transmitter. One or more signal strengths of the at least one of the features of interest may be acquired during operation of the UAV along the flight path.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
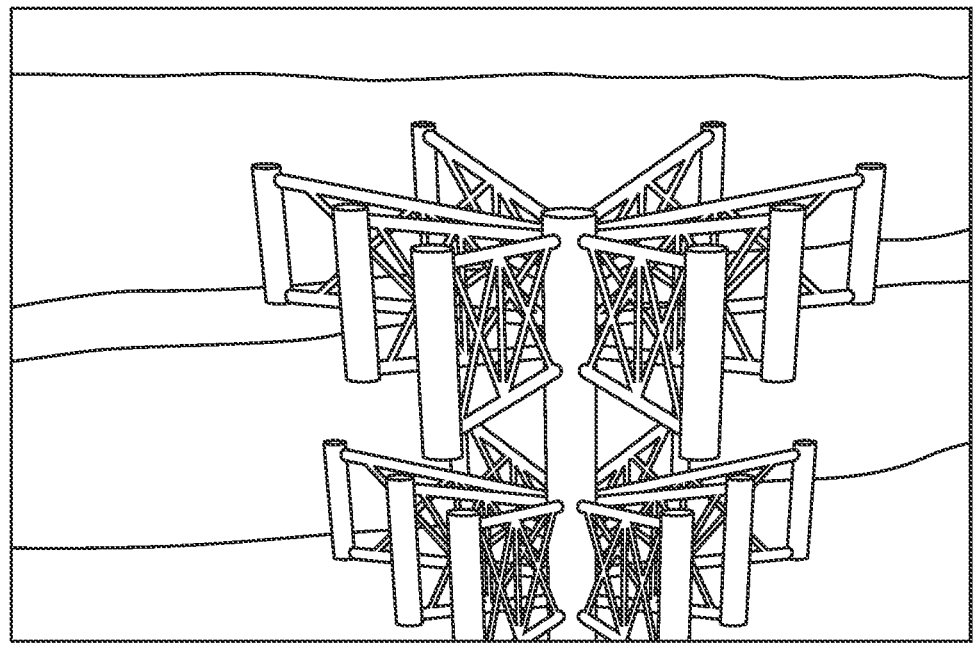
FIG. 1 is an image of a terrestrial structure acquired by an unmanned aerial vehicle in accordance with various embodiments of the present invention.

In accordance with embodiments of the present invention, inspection of a terrestrial structure begins with deployment of a camera-equipped UAV, which may be piloted remotely by a human operator to the structure to capture a series of images of the structure. In other embodiments, the UAV is programmed with the location of the structure and guides itself to the structure autonomously. Once in the proximity of the structure, the UAV acquires a series of still images of the structure. An exemplary UAV-acquired image of a terrestrial structure 100 (in this example a cell tower) is shown in FIG. 1. In various embodiments, the UAV acquires a series of images from different vantage points (e.g., angles and horizontal and/or vertical positions). For example, the UAV may completely or partially orbit the structure 100 multiple times, and the altitude of the UAV may be altered (i.e., raised or lowered) for each orbit, while capturing images of the structure 100. The images may be captured at a rate of, for example, 1-10 frames per second. In various embodiments, the UAV may also capture video of the structure 100 and/or portions of the UAV and/or its surroundings that is streamed to a human operator or other observer for, e.g., quality assurance.

Figure 2:
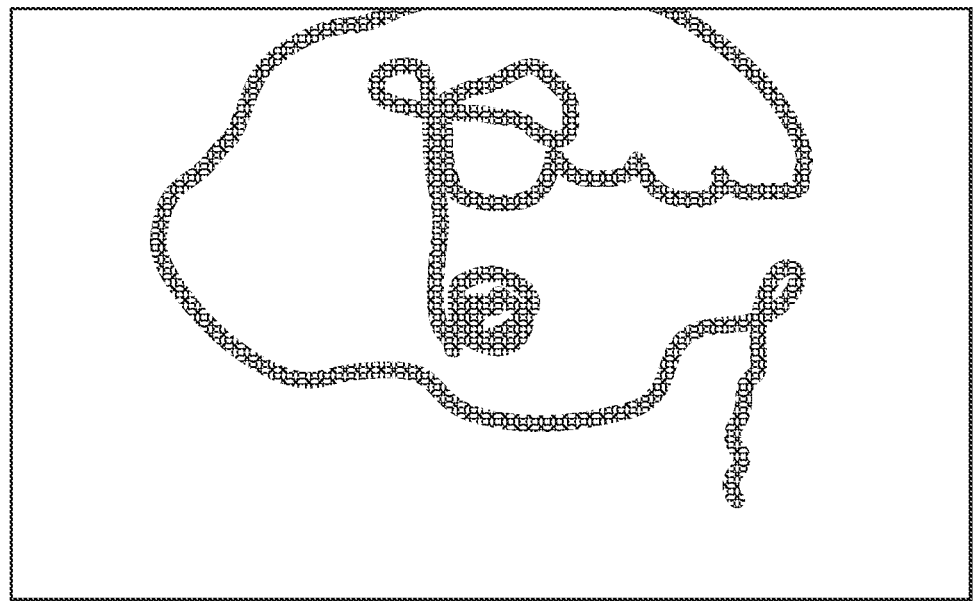
FIG. 2 is a graphical representation of an example unmanned aerial vehicle flight path for image acquisition of a terrestrial structure in accordance with various embodiments of the present invention.

During capture of the images of the structure 100, the flight path of the UAV is determined and stored, as that information will be utilized in the subsequent generation and calibration of the 3D model of the structure 100. For example, the UAV may be equipped with a GPS receiver that provides the position of the UAV during the flight path and, in particular, at the point at which each of the images of the structure 100 is acquired. The UAV may also be equipped with an altimeter (e.g., a barometer, a laser altimeter, a sonic altimeter, and/or a radar altimeter), which provides altitude information for the UAV. For example, the altimeter may provide altitude information based on the atmospheric pressure experienced by the UAV on the flight path. FIG. 2 is a graphical representation of a UAV flight path 200 around structure 100 in accordance with embodiments of the invention and in which each of the positions of the UAV corresponding to a captured image is represented by an outline. As mentioned above, each of these positions is determined and stored in a computer memory. The memory may be present onboard the UAV, or the various data (e.g., images, position and flight path information, etc.) acquired by the UAV may be wirelessly transmitted to another computer system and stored in a memory associated with that computer system (i.e., physically present at the computer or accessible to the computer over, e.g., a local network or the Internet).

After acquisition of the images of the structure 100, the images are utilized to construct a 3D model of the structure 100 by a utilizing conventional photogrammetry software (i.e., software that extracts geometric information from two-dimensional images and/or video such as 123D Catch available from Autodesk, Inc.) in accordance with embodiments of the invention. In various embodiments, such software stitches together the various images to generate a 3D graphical representation of the structure 100, albeit one that lacks scale and orientation information.

Figure 3:
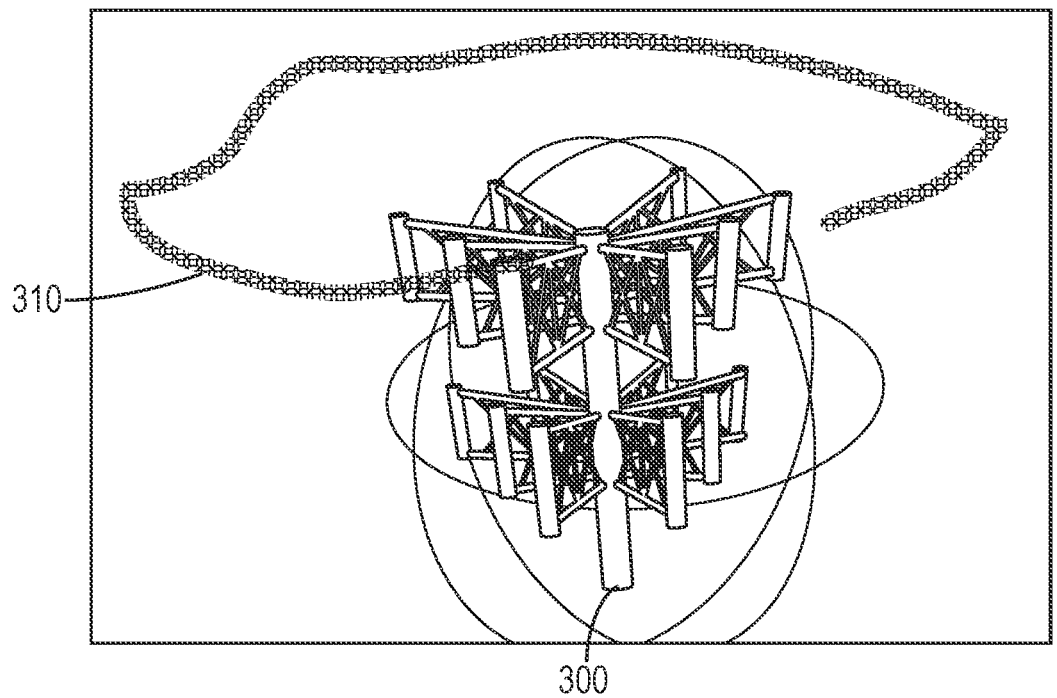
FIGS. 3-5 are images of three-dimensional models of a terrestrial structure constructed from images acquired by an unmanned aerial vehicle in accordance with various embodiments of the present invention.
Figure 4:
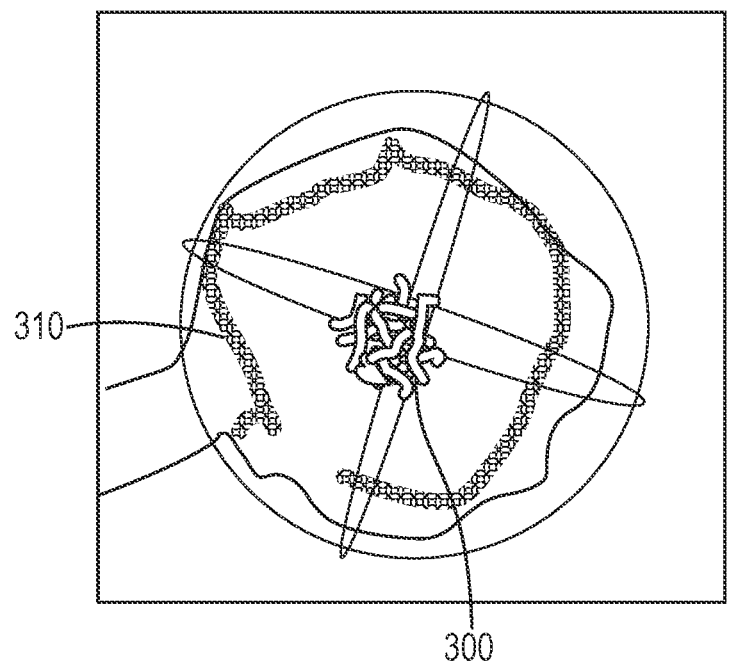
Figure 5:
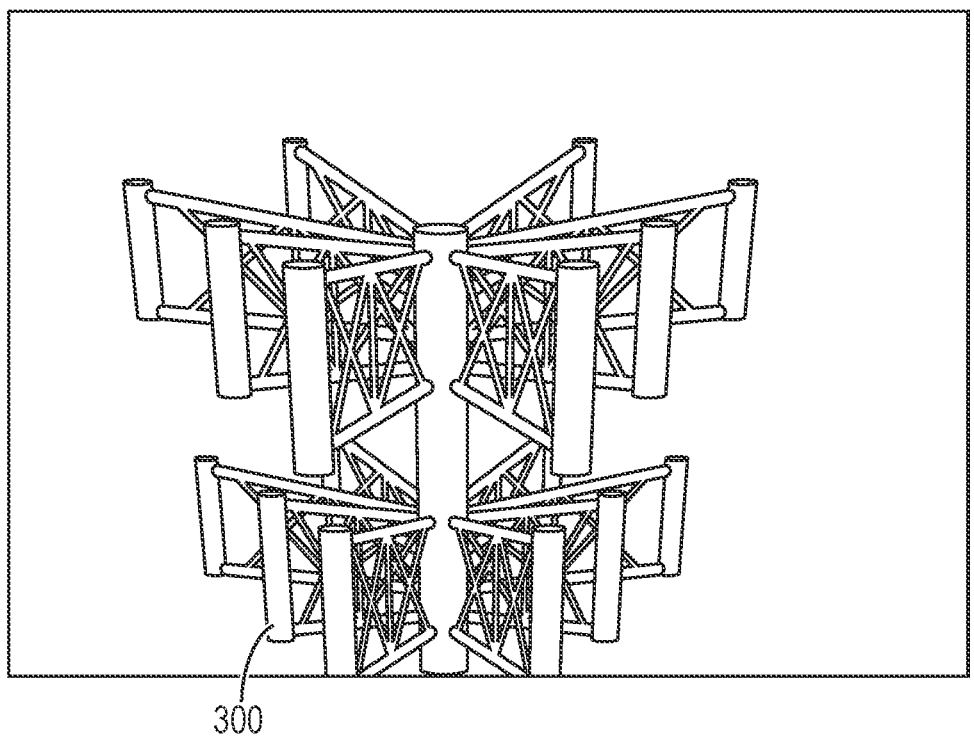

After construction of the unscaled 3D model, the model is utilized by the modelling system in accordance with embodiments of the present invention, in combination with the flight-path information, to construct a 3D model having both scale and absolute orientation information. The system mathematically reconstructs the positions at which the UAV captured the images of the structure 100 based on the flight-path information, and the image-capture positions may be overlaid on the model of the structure 100. FIGS. 3 and 4 depict a model 300 of the structure 100 constructed by the photogrammetry software with a series of image positions 310 depicted around the model 300. Each of the image positions 310 corresponds to the position of the UAV relative to the structure 100 when the corresponding image of structure 100 was acquired. FIG. 5 is another graphical representation of the 3D model 300 of the structure 100 inspected in accordance with embodiments of the invention. As shown, the model 300 accurately reproduces the shapes and locations of various objects on structure 100, for example antennae, support beams, etc., and the image of the model 300 closely approximates the actual acquired image of structure 100 depicted in FIG. 1.

Figure 6:
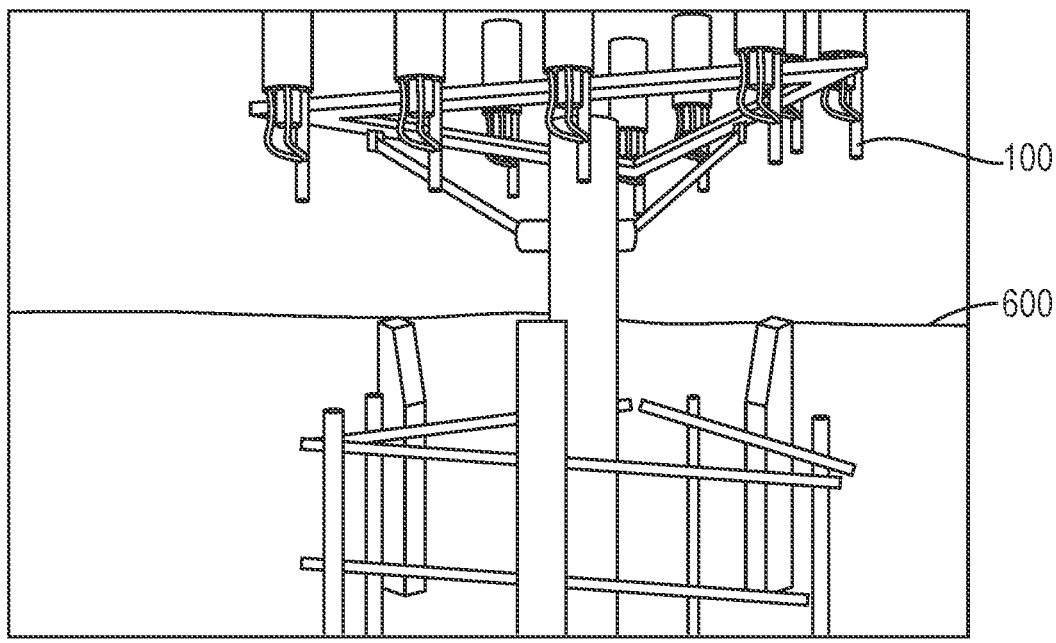
FIG. 6 is an image of a terrestrial structure acquired by an unmanned aerial vehicle and that includes the horizon line utilized for orienting models of the terrestrial structure in accordance with various embodiments of the present invention.

In accordance with various embodiments of the invention, the inspection system aligns the model 300 of the inspected structure 100 along one or two perpendicular axes based on images of the horizon (and/or features on the horizon) within at least some of the captured images but without reference to extrinsically placed ground markers not normally associated with the structure 100. The system also does not rely on distance measuring equipment such as paired high-frequency transmitter/receivers (i.e., interrogators) on the UAV and receivers/transmitters (i.e., transponders) on the ground proximate the structure 100. Rather, the system relies on views of the horizon to determine orientation of captured images relative to the surface. For example, FIG. 6 is one of the captured images of structure 100 that includes a horizon line 600 therein (the horizon is also present in the image of FIG. 1). Having recognized the horizon on at least some of the images, the system may orient the 3D model of the structure 100 with the horizon relative to each of the images to align the model on, e.g., tilt and roll axes (i.e., perpendicular axes parallel to the ground). In various embodiments, the system analyzes one or more of the images for general color groups therein, and then segments each image based on that information to divide it into groups based on color. The system may then extract the positions in the image where a color transition occurs that is indicative of the presence of the horizon line 600. For example, the brightness of the ground and the sky in the images may be different by at least a threshold amount, and the transition between those brightness levels may be considered to correspond to the horizon line 600.

The system may also determine scale information for the 3D model of the structure 100 based on the flight-path of the UAV. For example, GPS positioning data acquired during image acquisition may be utilized to determine distances traveled by the UAV when acquiring the images, and this information may be utilized to determine the size and scale of the structure 100. For example, the distance between the UAV and the structure 100 in the images may be calculated based on the distance travelled by the UAV, particularly since the optical properties of the camera and/or lens(es) on the UAV (e.g., field of view, resolution, etc.) are known, straightforwardly and without undue experimentation. This information may be utilized to provide scaling information for the structure 100 itself, since the size of the structure 100 may be deduced from the UAV flight-path information.

The model may also be further aligned in space based on the flight-path information. For example, the absolute coordinates of the UAV at various image-capture locations may be derived from the GPS and barometric data and utilized to align the model along the magnetic heading, or azimuthal, axis that is perpendicular to the tilt and roll axes mentioned above. That is, the structure and/or various features thereon are thereby aligned absolutely to a particular compass heading.

Figure 7:
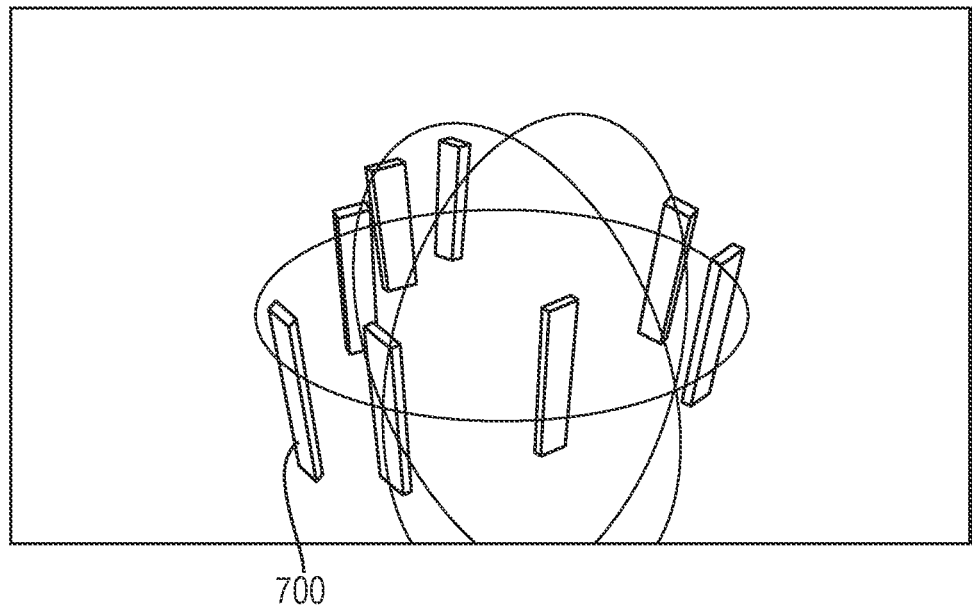
FIGS. 7 and 8 are graphical representations of features of interest identified on a three-dimensional model of a terrestrial structure constructed from images acquired by an unmanned aerial vehicle in accordance with various embodiments of the present invention.
Figure 8:
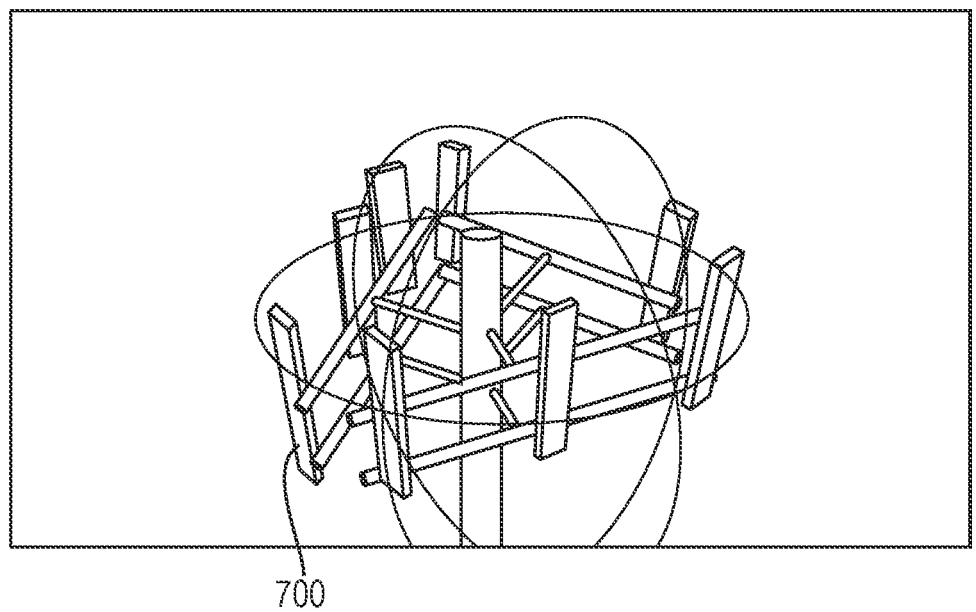

Once the system has scaled and aligned the 3D model of the inspected structure 100, the model may be utilized to provide elevation and/or orientation information for the structure 100, portions of the structure 100, and/or features of interest on the structure 100. For example, FIGS. 7 and 8 depict box meshes corresponding to features of interest 700 (in this example, antennae on a cell tower) identified on the 3D model of the structure 100. Features of interest may be identified on the model by various techniques. For example, a user may identify a feature of interest on an image of the model of the structure 100 by, e.g., clicking on the feature of interest and/or indicating its boundaries on the image. Alternatively, the system may be programmed to automatically match stored templates (i.e., descriptions of sizes and/or shapes and/or ranges thereof of common features of interest for a particular structure 100) with one or more shapes present in the model. Such image recognition is conventional and may be accomplished without undue experimentation. As shown in FIG. 7, one or more features 700 may be depicted in isolation, i.e., without depiction of other portions of the model. Alternatively, one or more features 700 may be overlaid in their identified locations on an image of the structure 100, as shown in FIG. 8.

Once the features of interest 700 are identified, the orientation and elevation of each feature may be calculated relative to the axes of the 3D model. And, since the 3D model is scaled and aligned relative to the horizon, as detailed above, those characteristics may be straightforwardly converted into absolute elevation and three-axis alignment information relative to the horizon, rather than merely relative to the structure 100 itself (or the model thereof). In this manner, elevation and alignment information for features of interest 700 may be safely and efficiently generated without the need for actual physical human presence on the structure or the use of extrinsic ground markers.

Figure 9A:
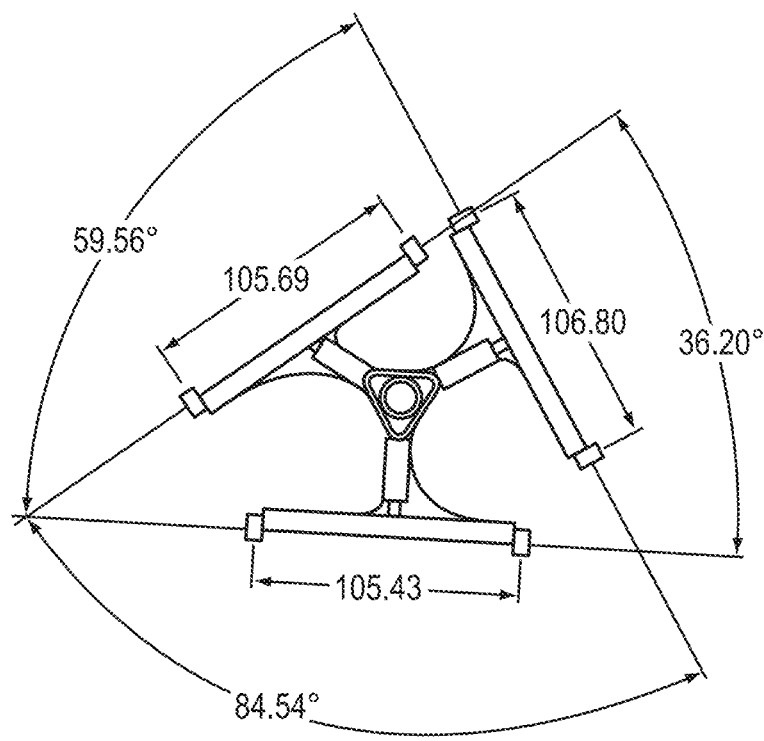
FIGS. 9A and 9B are graphical representations of two-dimensional slices of a three-dimensional model of a terrestrial structure constructed from images acquired by an unmanned aerial vehicle, each representation including relevant measurements of features of interest on the structure, in accordance with various embodiments of the present invention.
Figure 9B:
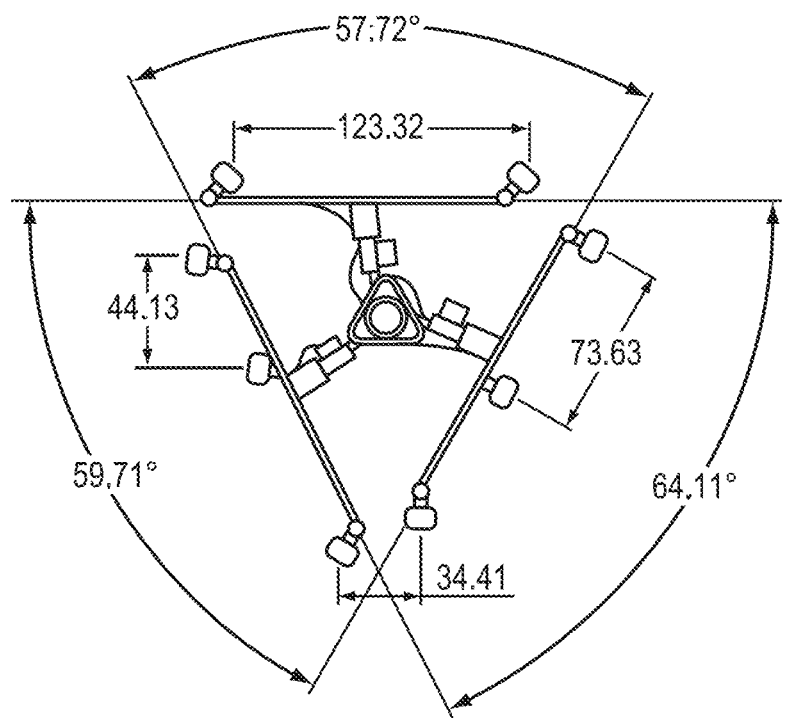

Systems in accordance with embodiments of the invention may be utilized to provide detailed scale and orientation information for various features of interest. As shown in FIGS. 9A and 9B, the system may also export scaled and oriented models produced by the system to other systems and/or software (e.g., computer aided design (CAD) software) for generation of detailed two-dimensional technical drawings of the structure 100, portions thereof, and/or features of interest 700. FIG. 9A depicts outlines of various features of interest 700 of an upper portion of structure 100, as well as size information (e.g., feature widths or lengths) and the angles between various pairs of the features 700. FIG. 9B depicts similar information for features of interest 700 present on a lower portion of the structure 100.

Systems in accordance with embodiments of the invention may also be utilized to identify and/or inventory specific structures 100 and/or components thereof without physical human presence on the structure 100. For example, an inspected structure 100 and/or various features of interest 700 and/or components of the structure 100 may be equipped with passive radio-frequency identification (RFID) tags, and the UAV may be equipped with an RFID energizer/reader/writer. The RFID tags may be encoded with information such as component names, makes, types, models, serial numbers, lot numbers, etc., and the reader on the UAV may energize the tags when in proximity thereto, receive the information embedded in the tags, and store the information in a local memory and/or transmit the information for remote storage. The system may correlate the received information to the scanned components within the generated 3D model and high-resolution images captured by the UAV, thereby enabling identification of specific parts, etc. on the inspected structure 100.

In various embodiments of the invention, an estimate of the remaining lifespan or service time of the structure 100 or of various features of interest 700 associated therewith may be determined based on the information received via the RFID scan. For example, one or more of the RFID sensor based tags may include read/write memory, a vibration sensor, a humidity sensor, a corrosion sensor, and/or a temperature sensor. For example, one or more of the RFID tags may contain an element that corrodes more rapidly than the (e.g., metal) structure 100 and/or one or more features of interest 700 and/or paint or other protective coating thereon. When the RFID tag is interrogated, the amount of corrosion, vibration, humidity, and/or temperature may be measured by the UAV and utilized to provide, at least in part, an estimated lifetime for one or more features of the structure. In embodiments in which structures 100 featuring antennas are inspected, the UAV may include a spectrum analyzer for measuring the antenna signal strength at discrete distances from the antennas along the UAV flight path, and a processor algorithm may be utilized to reconstruct a 3D signal-strength model of the inspected antennas.

Various embodiments of the invention utilize RFID sensor nodes and sensing elements detailed within U.S. Provisional Patent Application No. 62/348,657, filed on Jun. 10, 2016, and U.S. Provisional Patent Application No. 62/357,159, filed on Jun. 30, 2016, the entire disclosure of each of which is incorporated by reference herein.

As shown in, e.g., FIGS. 7 and 8, the generated 3D model 300 of the inspected structure 100 may be displayed to a user, who may, via information provided by the 3D model, observe the representation of the inspected structure 100 from any number of possible vantage points each corresponding to one of the UAV-captured images or interpolated therebetween. The user may also select the structure 100 or a feature of interest 700 thereon, and the captured and/or calculated information related to that feature of interest 700 may also be displayed to the user. For example, component type information, absolute elevation, and/or absolute alignment information in three axes may be displayed for the selected feature of interest 700.

Figure 10:
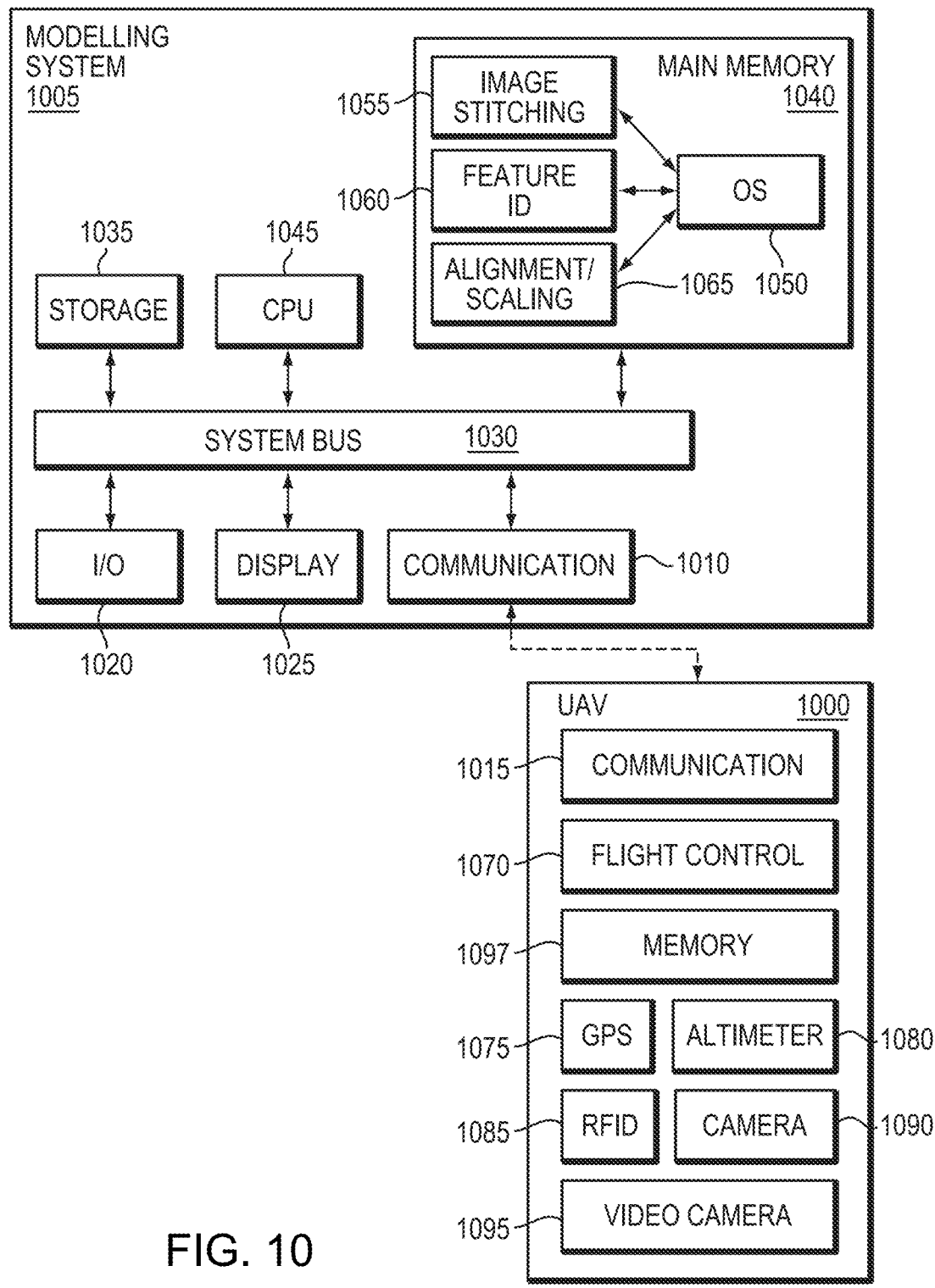
FIG. 10 is a block diagram of an unmanned aerial vehicle-based modelling system in accordance with various embodiments of the present invention.

FIG. 10 schematically depicts various components of a UAV 1000 and associated 3D analytic system 1005 in accordance with various embodiments of the invention. The various modelling and image-manipulation routines described above may be implemented, on the modelling system 1005, by computer-executable instructions, such as program modules, that are executed by a conventional computer processor. Generally, program modules include routines, programs, objects, components, data structures, etc. that performs particular tasks or implement particular abstract data types. Those skilled in the art will appreciate that the modelling system 1005 may be implemented using any of various computer system configurations, including multiprocessor systems, microprocessor-based or programmable consumer electronics, minicomputers, mainframe computers, and the like. The modelling system 1005 may also be realized in distributed computing environments where tasks are performed by remote processing nodes linked through a communications network. In a distributed computing environment, program modules may be located in both local and remote computer-storage media including memory storage devices.

Thus, referring to FIG. 10, the modelling system 1005 may include, consist essentially of, or consist of a general-purpose computing device in the form of a computer including a communication interface 1010 that interacts with the UAV 1000 (e.g., bi-directionally) via a similar communication interface 1015 on the UAV 1000. Communication interfaces 1010, 1015 may include, consist essentially of, or consist of, for example, one or more hardware interfaces (e.g., network interfaces and/or adaptors) enabling data communication via a network such as a wireless local-area network (LAN), wide-area network (WAN) and/or other type of networks such as an intranet, extranet, or the Internet. Some suitable communications protocols may include TCP/IP, UDP, OSI, Bluetooth, Zigbee, IrDa, or other suitable protocol. The communication enabled by communication interfaces 1010, 1015 is typically wireless, although in some embodiments wired links may be utilized.

The modelling system 1005 may also include one or more input/output devices 1020 (e.g., a keyboard, a mouse or other position-sensing device, etc.), by means of which a user can interact with the modelling system 1005, and a screen display 1025. The modelling system 1005 further includes a bi-directional system bus 1030 over which the system components communicate, a non-volatile mass storage device 1035 (such as one or more hard disks and/or optical storage units), and a main (typically volatile) system memory 1040. The operation of modelling system is directed by a central-processing unit ("CPU") or "processor" or "computer processor" 1045.

The main memory 1040 contains instructions, conceptually illustrated as a group of modules, which control the operation of the CPU 1045 and its interaction with the other hardware components of the modelling system 1005. An operating system ("OS") 1050 directs the execution of low-level, basic system functions such as memory allocation, file management and operation of the mass storage device(s) 1035. The operating system 1050 may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system or platform.

The modelling system 1005 may include within main memory 1040 various modules for generating, aligning, and scaling 3D models of inspected structures in accordance with embodiments of the invention and as detailed herein. For example, the modelling system 1005 may include an image stitching module 1055 for generating 3D models from collections of two-dimensional images of the structure acquired by the UAV 1000. The image stitching module 1055 may include, consist essentially of, consist of, and/or execute conventional photogrammetry software as detailed above. A feature identification module 1060 may identify the horizon line and/or features associated therewith to align generated 3D models along one or more axes. In addition, the feature identification module 1060 may, based on any of a variety of pattern- or image-recognition routines, identify various features of interest within images or on 3D models. The modelling system 1005 may also include an alignment and scaling module 1065 for aligning 3D models in space with respect to the horizon and for properly calibrating the scales of 3D models based at least in part on distances between captured images and/or distances between the UAV 1000 and the inspected structure during the UAV flight.

As shown in FIG. 10, the UAV 1000 may also incorporate a number of different modules or systems for controlling various aspects of its operation and for acquisition of various types of data as detailed herein. For example, the UAV 1000 may include a flight control module 1070 for controlling various hardware of the UAV 1000 (engines, propellers, etc.) to initiate UAV flight and direct the UAV 1000 along desired flight paths. The UAV 1000 may also incorporate various instruments for the acquisition of data used in accordance with embodiments of the invention. For example, the UAV 1000 may include a GPS receiver 1075 for receiving GPS coordinates and an altimeter 1080 (e.g., a barometer) for determining the altitude of the UAV 1000 during flight. The UAV 1000 may also incorporate an RFID scanner 1085 for scanning RFID tags on inspected structures, e.g., for the purposes of inventory and/or specific component identification. The UAV 1000 also includes a camera 1090 for acquiring the images of structures during inspections, and the UAV 1000 may also include a video camera 1095 for acquiring and/or streaming a video feed of the flight of the UAV 1000 and/or the inspected structure during flight to an operator or other remote observer. The UAV 1000 may also have an onboard memory 1097 for local storage of acquired data and images; such data and images may also or instead be wirelessly transferred to the modelling system 1000 via the communication module 1015 on the UAV 1000.

In various embodiments, the UAV 1000 may incorporate an inertial measurement unit utilized for inertial navigation and/or to determine the drone orientation, acceleration, velocity, and/or position. For example, the inertial measurement unit may include, consist essentially of, or consist of one or more conventional inertial navigation instruments such as accelerometers, magnetometers, and/or gyroscopes.

In various embodiments of the invention, the UAV 1000 incorporates safety and collision-avoidance systems and/or implements safety protocols detailed in U.S. patent application Ser. Nos. 15/285,078, 15/285,080, and 15/285,084, all filed on Oct. 4, 2016, the entire disclosure of each of which is incorporated by reference herein.

Any suitable programming language may be used to implement without undue experimentation the analytical functions described above on the modelling system 1005. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the systems and methods of the invention. Rather, any number of different programming languages may be utilized as is necessary or desirable.

The modelling system 1005 may also include other removable/nonremovable, volatile/nonvolatile computer storage media 1035, as mentioned above. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The storage media are typically connected to the system bus 1030 through a removable or non-removable memory interface.

The processing unit(s) 1045 and various modules that execute commands and instructions may be general-purpose processors, but may utilize any of a wide variety of other technologies including special-purpose hardware, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the functionality detailed herein.

The terms "component," "system," "platform," "module," and the like refer broadly to a computer-related entity or an entity related to an operational machine with one or more specific functionalities. Such entities may be hardware, a combination of hardware and software, software, or software in execution. For example, a component may be, but is not limited to being, a process running on a processor, a processor, an object, an executable, a thread of execution, a program, and/or a computer. By way of illustration, both an application running on a system and the system may be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, etc.) used to provide machine instructions and/or data to a programmable processor, including a machine-readable medium that receives machine instructions as a machine-readable signal. The term "machine-readable signal" refers to any signal used to provide machine instructions and/or data to a programmable processor.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for developing and rendering a three-dimensional (3D) model of a terrestrial structure, the system comprising:
    operable along a flight path that at least partially orbits the structure one or more times, an unmanned aerial vehicle (UAV) for acquiring (i) images of the structure along the flight path, each of the images being acquired at a different relative position between the UAV and the structure, wherein at least some of the images each include a view of a horizon, and (ii) global positioning system (GPS) coordinates of the UAV at each of the relative positions;
    a computer memory for storing (i) the images of the structure acquired by the UAV and (ii) the GPS coordinates of the UAV at each of the relative positions;
    one or more computer processors;
    executable by the one or more computer processors, an image-stitching module for generating a 3D model of the structure from the plurality of images, the 3D model lacking scale and alignment information;
    executable by the one or more computer processors, a feature-identification module for identification of a horizon line within one or more of the images;
    executable by the one or more computer processors, a scaling module for calibrating a scale for the 3D model based at least in part on distances between at least some of the relative positions; and
    executable by the one or more computer processors, an alignment module for aligning the 3D model based at least in part on the identified horizon line within the one or more of the images.

2. The system of claim 1, wherein the alignment module is configured to align the 3D model (A) on (i) a tilt axis and (ii) and a roll axis perpendicular to the tilt axis based at least in part on the identified horizon line within the one or more of the images, and (B) on an azimuthal axis perpendicular to the tilt and roll axes based at least in part on the GPS coordinates of at least some of the relative positions.

3. The system of claim 1, further comprising a communication interface for bi-directional communication with the UAV.

4. The system of claim 1, further comprising a display for rendering the model along a user-selected viewing axis.

5. The system of claim 1, wherein the image-stitching module comprises or executes photogrammetry software.

6. The system of claim 1, further comprising, executable by the one or more computer processors, a display module for displaying the 3D model after scaling and alignment thereof to a user.

7. The system of claim 1, wherein the structure comprises a cell tower.

8. The system of claim 1, wherein the UAV comprises (i) a video camera for acquiring a video stream during operation along the flight path, and (ii) a transmitter for transmitting the video stream to at least one of a remote human operator or a remote human recipient.

9. The system of claim 1, wherein the UAV comprises a radio-frequency identification (RFID) scanner for scanning RFID tags on or associated with the structure while the UAV is operated along the flight path.

10. The system of claim 1, wherein the structure comprises one or more features.

11. The system of claim 10, wherein at least one of the features is an antenna.

12. The system of claim 10, wherein the UAV comprises a spectrum analyzer for measuring signal strengths of signals emitted by at least one of the structure or at least one of the features.

13. The system of claim 10, wherein the one or more computer processors are configured to calculate, using the 3D model, at least one of a height or an orientation relative to the horizon of at least one of the features.

14. The system of claim 1, wherein the UAV comprises a spectrum analyzer for measuring signal strengths of signals emitted from the structure.

* * * * *